United States Patent
Hong et al.

(10) Patent No.: US 7,536,877 B2
(45) Date of Patent: May 26, 2009

(54) OPTICAL FIBER FABRICATION AND PRODUCT

(75) Inventors: Siu-Ping Hong, Alpharetta, GA (US); Steven Alan Jacobs, Needham, MA (US); David Kalish, Roswell, GA (US); Albert John Ritger, Lawrenceville, GA (US); Ian A. White, Dunwoody, GA (US)

(73) Assignee: Fitel USH Corp., Norcross, GA (US)

( * ) Notice: Subject to any disclaimer, the term of this patent is extended or adjusted under 35 U.S.C. 154(b) by 1036 days.

(21) Appl. No.: 10/407,298

(22) Filed: Apr. 4, 2003

(65) Prior Publication Data

US 2004/0194512 A1 Oct. 7, 2004

(51) Int. Cl.
*C03B 37/023* (2006.01)
(52) U.S. Cl. .............................. 65/402; 65/425; 65/435
(58) Field of Classification Search .................. 65/402, 65/435, 425
See application file for complete search history.

(56) References Cited

U.S. PATENT DOCUMENTS

| 3,711,262 | A |   | 1/1973 | Keck |   |
|---|---|---|---|---|---|
| 3,737,292 | A |   | 6/1973 | Keck |   |
| 3,912,478 | A | * | 10/1975 | Presby | ........................ 65/402 |
| 3,966,446 | A |   | 6/1976 | Miller |   |
| 4,038,062 | A |   | 7/1977 | Presby |   |
| 4,062,665 | A |   | 12/1977 | Izawa |   |
| 4,217,027 | A |   | 8/1980 | MacChesney |   |
| 4,929,264 | A | * | 5/1990 | Di Vita | ........................ 65/507 |
| 5,316,562 | A | * | 5/1994 | Smithgall et al. | .............. 65/377 |

OTHER PUBLICATIONS

Definition of "elastic wave", National Instruments, from website http://zone.ni.com, (Jun. 6, 2006).*

* cited by examiner

*Primary Examiner*—John Hoffmann

(57) ABSTRACT

An expeditious method for introducing geometric perturbations into lightguide during fabrication offers a perturbation stream of amplitude and periodicity—constant or varying—to satisfy a variety of needs.

11 Claims, 4 Drawing Sheets

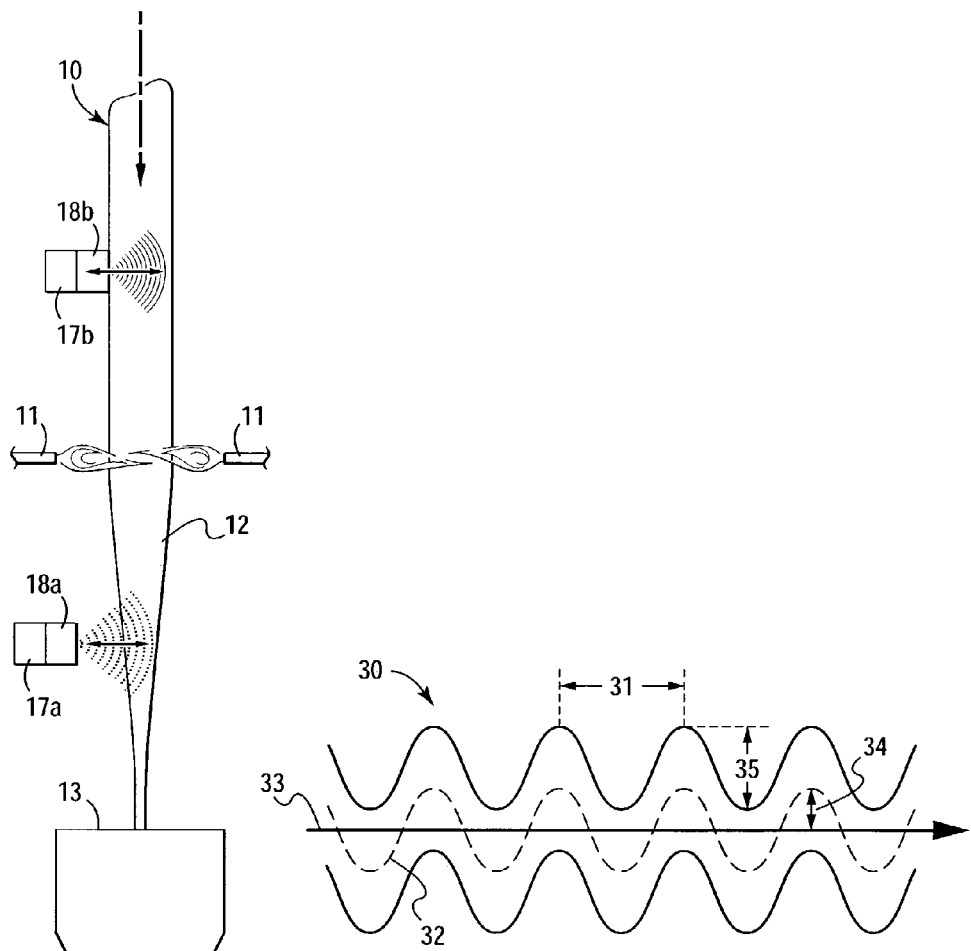
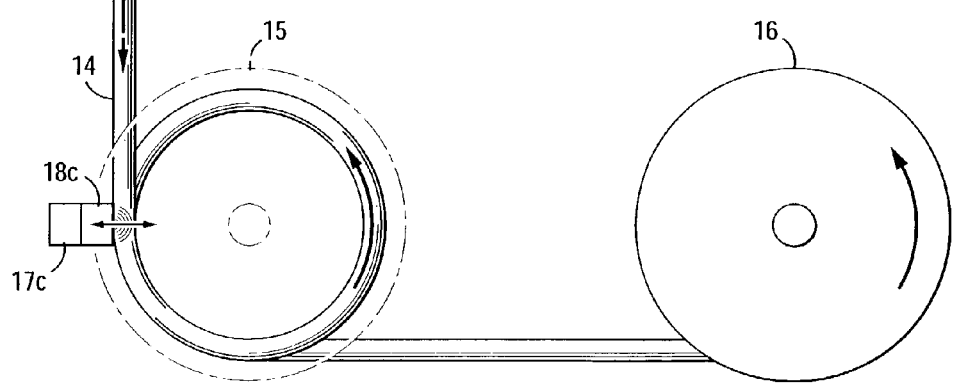
FIG 3
FIG 1

OPTICAL FIBER FABRICATION AND PRODUCT

FIELD OF THE INVENTION

Fabrication of lightguide with periodic perturbations for mode coupling.

BACKGROUND OF THE INVENTION

The multimode fiber—the initially introduced optical fiber structure expected to dramatically change communications—did not fulfill expectations. The laser-yielded pulse stream to be modulated by signal information, single-mode as introduced at the transmitter, was no longer single-mode as detected at the receiver. Collisions with defects in the glass fiber caused mode conversion, ultimately yielding pulses constituted of photons of a broad spectrum of higher-order modes, extending even beyond those which could be guided by the fiber structure (to "lossy" modes—to modes soon lost by radiation). Consequential mode-dispersion resulted in pulse spreading—with lower order modes at the leading edge of the pulse and higher order at the trailing edge. This restricted the pulse repetition rate of the injected train to the maximum rate with sufficient retained pulse separation to enable detection of now-broadened pulses upon arrival at the detector. This led to an extensive effort directed to limiting pulse broadening. (Added loss, due to radiation of lossy modes was not initially a focal point.)

The result of the effort is represented by the "perturbed" fiber of U.S. Pat. No. 3,966,446, issued Jun. 29, 1976. The patentee, S. E. Miller, pioneered in an approach born of desperation. Expedient means for reducing defect count in the glass, and thereby limiting mode conversion, had not been found—and this is true to the present day. The Miller approach was to, instead, confront the traveling pulse with a sufficiently increased number of mode conversion centers so that each photon arriving at the detector would have spent a near-equal amount of time as every permitted mode—in order to "average" photon transit times—thereby lessening variation in photon arrival times, and restricting pulse spreading. "Perturbations" in index-of-refraction, corresponding with deliberate changes in glass composition, introduced during formation of the fiber preform and carried over into the drawn fiber, would serve as mode coupling centers (as conversion centers) to bring about extensive ongoing mode conversion. To implement the approach, Dr. Miller introduced a new fiber fabrication method—one permitting the abrupt index changes which, until then, had been anathema to the fiber fabricator.

H. M. Presby, in U.S. Pat. No. 4,038,062, issued Jul. 26, 1977, used changes in size/shape—"geometric perturbations" rather than Miller's "compositional perturbations"—introduced in a process offering good perturbation uniformity. Rather than transferring the perturbations from the preform to the fiber, the Presby process utilizes a pulsating heat source which, acting on the already-drawn fiber, yields perturbations of near-constancy in size and spacing.

To large extent, development effort directed to more general use of mode-mixing lost momentum with introduction of single-mode fiber. A form of mode-mixing, still permitted in single-mode fiber, however, is addressed in a commercial process in common use. In that process, dispersion between polarization modes is lessened by repeatedly rotating the fiber undergoing drawing through a ninety degree angle.

There was, however, a continuing interest in multimode fiber, for use, e.g., in local area networks, and, withal, some continuing effort on perturbed fiber. Slackened effort, at this time, is ascribed to the added loss due to eventual coupling to, and radiation loss of, unguided modes (of modes of too high order to be supported by the fiber). That loss penalty has, in general, been too high a price to pay for increased pulse repetition rate.

CO-FILED APPLICATIONS

Co-pending patent application, "Enhanced Multimode Fiber," Ser. No. 10/408,076, now U.S. Pat. No. 6,990,277, filed on even date herewith and assigned to the assignee of this application, and hereby incorporated by reference, offers solution to the problem of added loss in perturbed fiber. The inventor first appreciates that the fields, associated with photons of differing mode-order, peak at different distances from the optical center of the fiber—at successively increasing radius as mode-order increases—so enabling the inventor, through judicious tailoring of cross-sectional index-of-refraction profile, to selectively affect behavior of a particular mode. Then, drawing on developments in the UV-grating art, he makes the association between mode-coupling probability and perturbation period—that increasing intervals between perturbations decreases probability of coupling of "more broadly separated" modes (modes separated by larger differences in effective index-of-refraction). According to this invention, by combining the two effects, the "Enhanced Multimode Fiber" (EMF) manifests reduced probability of (unwanted) coupling between guided and unguided modes, without, in the first instance, affecting (wanted) coupling between guided modes.

A second co-pending patent application "Optical Fiber For Single-Mode Operation," Ser. No. 10/407,376, now U.S. Pat. No. 6,839,484, filed on even date herewith and assigned to the assignee of this application, and which is hereby incorporated by reference, makes selective use of the loss mechanism that has plagued the perturbation effort. The there-claimed "Enhanced Single Mode Fiber" (ESMF) uses a larger core diameter than in conventional single-mode fiber—one of sufficient size to support a small number of higher-order modes in addition to the fundamental mode—then resorts to deliberate use of the loss mechanism, avoided in co-pending patent application "Enhanced Multimode Fiber", to couple those unwanted higher-order modes to a cladding mode. In this manner, such higher-order modes are discarded by irradiation, without significantly added loss of the fundamental mode. Attributes of the fiber are largely associated with reduced light density (for given signal density), accompanying the fiber's larger Mode Field Radius (MFR).

The co-pending applications mark a climax in design evolution for perturbed fiber—from one adequately served by random or near-random perturbation periods, to one requiring precise spacing for desired selective coupling.

SUMMARY OF THE INVENTION

The invention is concerned with a method of fabrication of perturbed lightguides that depend on geometric perturbations for mode conversion. While discussion is largely in terms of optical fiber—expected to be the area of first commercial impact—implications for other "lightguide devices" are not ignored.

The inventive fabrication method entails creation of geometric perturbations constituted of periodic deformations along the lightguide—perturbations of regular period, or of period deviating from regularity in meaningful manner. Since accompanied by change in effective index of refraction, $\Delta n_{eff}$, geometric perturbations serve as mode-coupling centers, in the same manner as more familiar compositional perturbations.

One category of contemplated perturbations—"size perturbations"—is primarily dependent on changes in cross-sectional area of the fiber. Responsible deforming forces may be axial, or radial and symmetrically distributed about the fiber periphery. Resulting "symmetric perturbations" need entail no change in cross-sectional shape or index profile—may consist in their entirety of changes in cross-sectional area. Perturbations of a second, and preferred category,—"axis perturbations"—need entail no deliberate change in cross-sectional area—may, in first instance, consist entirely of changes in axial direction. Perturbations of both categories, as well as hybrids of the two, alter the relevant mode field(s), thereby changing the effective index-of-refraction, $n_{eff}$, for relevant mode(s), and serving as coupling centers.

Fabrication of fiber containing perturbations of either of the basic categories, since not requiring changed (cross-sectional) fiber profile or shape, is undemanding. Processing simplification, contributing to high yield and low fabrication cost, is maximized for axis perturbations—contributing to its designation as preferred embodiment.

On the other hand, available variations in fiber profile/shape, defining the perturbations, as well as variations in perturbation amplitude, afford additional degree of design freedom. Such variations may translate into corresponding wavelength specifications for devices such as, e.g., pass- or blocking-filters, and wavelength selective attenuators.

Substitution of geometric perturbations of the invention, for compositional perturbations, may advance precision. For one thing, since, in all instances, accompanied by measurable dimensional changes at the fiber surface—by "surface undulations"—size and position of contemplated geometric perturbations are readily monitored during fiber manufacture. At least as important, means exist in an allied art for introduction of a well-controlled perturbation stream—of constancy or tailored variability—in either or both of period and amplitude. For this, the invention takes advantage of the highly developed acoustical art, with its ability to deliver and manipulate acoustic waves of dependable frequency and amplitude.

Inventive methods contemplate lightguide fabrication entailing solidification of a solid body from a fluid (with fiber drawing of inorganic glass fiber from a larger-diameter preform, through the fluid draw region, being the more familiar embodiment). In accordance with the invention, an acoustic generator serves for introduction of an acoustic wave into the fluid during fabrication, so that wave motion produces periodic deformations in the solidifying body. Regular or varying perturbation period, as desired, then becomes a mathematical function of a combination of two art-assured regular contributions: 1) (controllable) frequency of the acoustic wave generator; and 2) (generally fixed) solidification rate for the lightguide being fabricated. Amplitude of the perturbation-generating wave is a direct function of the readily-controlled input power of the generator. The fractional amplitude of the fluid wave retained in the solidified lightguide is a function of draw rate together with temperature gradient in the vicinity of the solidifying interface, both implicitly regular in state-of-the-art optical fiber fabrication. Significantly, the invention is seen as satisfying the need for the controlled perturbation period required for implementation of very demanding perturbed fiber designs such as those of co-pending patent application "Enhanced Multimode Fiber".

Optical filters are among devices critically dependent on transfer of light for performance of a primary function, and, constitute one class of lightguide devices that may benefit by the inventive teaching. In particular, low-cost blocking filters of precise, well-controlled pass spectra, are economically feasible. Like optical fiber structures, such devices may depend on constant-period or on varying-period perturbation streams. Controlled constant-period devices perform traditional filter functions, while composite streams—yielded by two or more acoustic waves in combination—may perform more exotic functions (e.g., with the increased specificity of an apodizing filter).

Note: Description in following sections is generally in terms of optical fiber fabrication. This is considered appropriate since: 1) initial use is expected to concern fiber, and; 2) introduction and design of the geometric perturbations, central to the invention, are facilitated by use of fiber fabrication techniques. That description is in terms of state-of-the-art practice, entailing core and cladding, both of inorganic glass—generally of silica-based composition.

Applicability of the inventive process is not so limited. Undulations, based primarily on geometric change as introduced during draw, do not depend on introduction in the course of otherwise-conventional fiber fabrication. Other glass compositions—inorganic as well as organic, for the entirety or portions of the fiber cross-section—are contemplated.

BRIEF DESCRIPTION OF THE DRAWINGS

FIG. 1 is a schematic representation showing fabrication of fiber containing axis perturbations;

FIG. 3 schematically depicts a fiber with axis perturbations, e.g., fabricated by the process of FIG. 1;

Figures 2, 4:
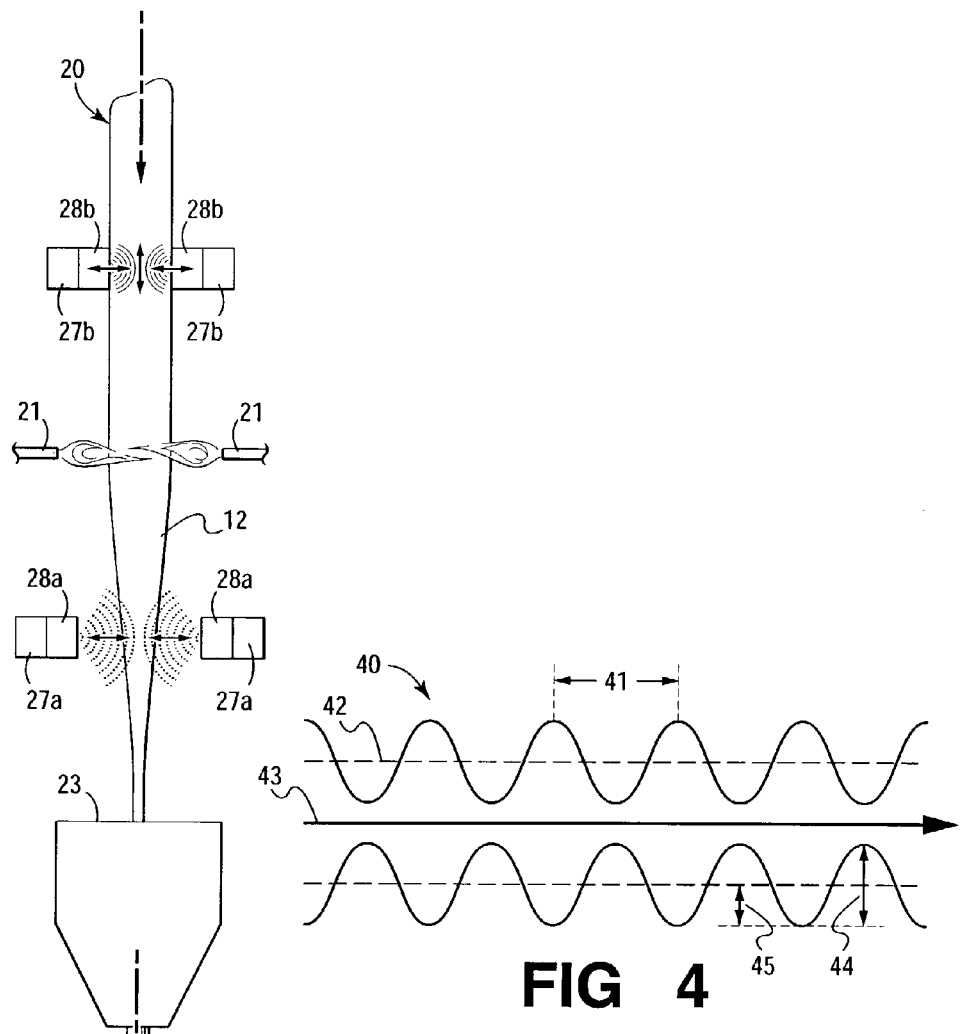
FIG. 2 is a schematic representation showing fabrication of fiber containing size perturbations.
FIG. 4 schematically depicts a fiber with size perturbations—with core regions of successively large and small diameter e.g., as produced by the process of FIG. 2.

TERMINOLOGY (Meanings of Terms, always Consistent with Common Usage, are Sometimes More Specific.)

ESMF (Enhanced Single-Mode Fiber)—Designation for the large-core, single-mode fiber of co-pending patent application "Optical Fiber For Single-Mode Operation", in which second and any additional supported higher-order modes are preferentially coupled to lossy cladding modes by means of a perturbation stream.

Few-mode Fiber—Fiber of core size sufficient to support from two to four modes including the fundamental mode—the preferred structure of ESMF.

EMF (Enhanced Multimode Fiber)—Designation for the perturbed fiber of co-pending patent application "Enhanced Multimode Fiber", in which added loss associated with the perturbation stream is lessened by means of fiber profile designed to decouple lossy cladding modes.

Mode—Independent, self-supporting, electromagnetic field, constituted of an electric field component and a magnetic field component, that propagates axially along the optical fiber independent of all other modes. Generally-intended linearly polarized modes are identified in accordance with the convention, $LP_{mn}$, in which "m" is the azimuthal mode number and "n" is the radial mode number.

Consistent with common practice, "mode" is sometimes used as synonymous with "mode group" where suitable, e.g., where phase-velocity is described and modal members of the group are of the same phase-velocity. Unless otherwise specified, the term includes both polarizations.

Mode Coupling (or Mode Mixing)—Constituting, or entailing, conversion of one mode to another, e.g., as from a bound mode to a cladding mode, or from one bound mode to another bound mode.

Mode Stripping—Elimination of modal energy contained in one or more modes by radiation from the fiber—accomplished by coupling of a bound mode to a cladding mode. This is the means whereby ESMF performance is made single-mode.

Perturbation—Change in fiber characteristic that locally alters effective refractive index of concerned mode(s) from that in immediately preceding and succeeding fiber length, thereby provoking mode coupling—without modifier, referring to changes accompanying deliberately introduced geometric distortions in accordance with the present invention. Study of perturbations—those constituting change in composition as well as geometry—is at an advanced level, and is reported in "Optical Waveguide Theory" A. W. Snyder and J. D. Love, Chapman Hall 1983.

Perturbation Stream—Succession of pulses, generally of uniform or meaningfully non-uniform spacing. An example of the latter is a composite stream, in effect or in actuality, made up of a combination of two or more evenly-spaced streams. The inventive method, in being dependent on (acoustic) wave motion, lends itself to multiple, small-amplitude perturbations, for which reason, a "stream" ordinarily contemplates a succession of at least five perturbations.

Nominal—As modifying dimension/shape, permits deviation of ±5%, e.g., in linear dimension or in cross-sectional shape—so that "nominally circular" signifies that radius or other linear dimension defining circularity may deviate from that of a circle by a maximum of ±5%.

Feature (or Index Feature)—As referring to the index-vs.-radial position profile of an optical fiber, any region contained either in the core or cladding, of changed index-of-efraction relative to a hypothetical fiber without such region—i.e., relative to a fiber in which index value is unchanged from adjoining core or cladding.

Core—Innermost region of the fiber with primary responsibility for guiding—constituted of material of greater index-of-refraction than that of the cladding within which it is enclosed. A common silica-based fiber structure has a germania-doped core within an undoped cladding.

The radial dimension of the core is ordinarily considered to be the dimension from the center of the fiber to the radially-measured onset of material of index equal to or less than that of the outer cladding, i.e., of index equal to or less than the "predominant cladding index", $n_{cl}$.

Cladding—The entirety of the fiber outside the core—in accordance with general usage, referring to the inorganic glass cladding produced during fiber drawing as an integral part of the fiber—unless otherwise indicated not including applied organic coating(s).

$\Delta$ (or Fiber Delta)—A measure of the guide strength of the fiber, in accordance with the equation:

$$\Delta = (n_{co}^{max} - n_{cl})/n_{co}^{max}$$

in which:
$n_{co}^{max}$=maximum refractive index in the core
$n_{cl}$=predominant refractive index of the cladding Members of the primary class of fiber structures contemplated have $\Delta$ values characteristically within the range of 0.0015 to 0.02.

% $\Delta$—Fraction of fiber delta expressed as a percentage.

Acoustic wave—Refers to an elastic wave, whether or not in the audible range, which may be introduced into the fluid region via ambient or via solidified glass.

DETAILED DESCRIPTION

1. Introduction

Geometric perturbations affect supported light through change in effective index-of-refraction, $\Delta n_{eff}$, for affected mode(s) of that light. Since, in these terms, identical to cause and effect of the usual compositional perturbation, device design, including perturbation spacing and amplitude, makes use of well developed principles. Processes of the invention are designed to satisfy those principles. Required processing conditions are readily calculable (as in instance of perturbation period), or may be determined on basis of simple trial (as in instance of needed input power to the acoustic generator). The artisan is familiar with relationships based on these principles, so that it becomes unnecessary to describe them here.

Applicability of the inventive teaching—the broad range of benefiting lightguide devices—is known. "Perturbed" devices—sometimes in those very terms—have been considered. Various of these devices benefiting from the present advance have already been identified, or are readily identifiable on basis of known design principles. Inventive processes may expedite production of known devices not before practicable. Included description is adequate to enable identification and fabrication of eligible devices, whether or not previously known.

2. General

A first invention requirement is for device fabrication entailing a solidifying solid-fluid interface—in the instance of conventional fiber fabrication, satisfied by use of familiar methods/apparatus without fundamental alteration. Many commercial processes used today provide for drawing from a preform via a fluid (draw) region, thereby implicitly meeting that need. Preform fabrication processes in use include Modified Chemical Vapor Deposition (MCVD), Outside Vapor Deposition (OVD), and Vapor Axial Deposition (VAD). However the preform is fabricated, the fiber draw process need be altered only to provide for generation of the geometric deformations constituting the perturbations themselves. Generation of such deformations is accomplished by means of an acoustic wave generator, acoustically coupled with, and introducing appropriate acoustic wave energy into the fluid region—in the instance of fiber fabrication, into the fluid draw region. In accordance with the invention, wave motion manifested in the vicinity of the solidifying fluid-solid interface or elsewhere in the fluid—e.g., of the draw interface—results in some fraction of that fluid wave motion being "captured" in the solidifying lightguide and producing the intended deformations.

Desire for perturbation uniformity, or more generally, controllability, is satisfied by known procedures of the concerned arts. The fiber draw art long ago met extreme uniformity demands: for diameter control, e.g., of 125 microns (μm)±1 μm, with standard deviation of 0.2 μm. In accordance with today's practice, such deviation while occurring, is observed over a minimum distance of tens of meters. Similarly, compositional control yields point-to-point constancy of refractive index, and of compliance of index profile to a prototype (e.g., of a range of 5%)—all for kilometer fiber lengths. That same control now becomes meaningful for implementation of the invention. Apparatus/procedures to satisfy those demands assure the fundamental characteristics now to be introduced by imposition of geometric perturbations. As an example, constant draw rate is accompanied by temperature constancy in the vicinity of the draw interface, in turn assuring viscosity constancy and faithful replication of generated wave motion. This translates into constancy/controllability of the magnitude of the fraction of that wave motion which is retained in the solidifying fiber (and, consequently, of change in effective index-of-refraction).

The only factor lacking for implementation is assured constancy/controllability of the acoustic wave as introduced. For this, the invention borrows from the acoustic arts. In fact, it may invade the realm of the audiophile, benefiting from his ceaseless demand for increasingly faithful sound reproduction. (Typical values of draw rate and desired perturbation period often combine to yield frequencies within the audible range—i.e., are often satisfied by imposed wave energy within the audible range.)

It is the nature of the advance that appropriate design/processing parameters are readily determined by trial. Values in the numbered examples were determined in this fashion, and it is likely it will continue to play this role. A very large range of parameters will produce a measurable effect which, whether too small or too large, will serve as basis to make the few generations of change required to meet specification. While methodology for calculation certainly exists, relationships—e.g., from input power for the acoustic generator; to fluid viscosity; to character of the acoustic wave as arriving at the solidifying interface; to perturbation size—may be complex. Prescription by the simple trial required may well continue to be the desired approach for determining processing conditions, thereafter to serve as processing specifications.

3. The Perturbed Lightguide

Resulting perturbations may be: a) "asymmetric"—constituting a succession of small fiber bends and/or deviations from cross-sectional circularity, with or without significant accompanying change in fiber size; b) "symmetric"—constituting a succession of small changes in cross-sectional radius or; c) combination. A unifying theme is the measurable geometric undulation in fiber surface—accompanying perturbations and offering expedient means for monitoring their shape, size, spacing, etc.

As set forth in the co-pending applications, useful perturbation amplitude—in the instance of this invention, approximated by undulation amplitude at the fiber surface—is generally such as to yield $\Delta n_{\mathit{eff}}$ value $\geqq 0.0001\%$ $\Delta$. Contemplated amplitude range, of $\Delta n_{\mathit{eff}}$ from 0.0001-0.01% $\Delta$, generally corresponds with surface undulations within the range 10-1000 Angstroms (Å).

Use of many small perturbations, in accordance with the invention, is functionally equivalent to a lesser number of large perturbations, results in lessened scattering loss, and is desirable. Repeating perturbations, at the low end of the undulation size range, 10-100 Å—either symmetric or asymmetric—may couple 99.9% of pulsed light in as little as 3 millimeters (mm) of guide length. For now-contemplated optical fiber designs requiring performance uniformity, a perturbation stream of $\geqq 5$ perturbations of size 10-1000 Å will generally suffice in instances in which wavelength specificity is unimportant. For optical fiber fabrication, the usual objective, of intermodal resonant power exchange, requires a degree of wavelength specificity assured by a regular-period primary perturbation stream of at least 100 perturbations. In common with earlier perturbed structures, commercial fiber will likely entail much longer perturbation streams—perhaps extending over entire production lengths. Functions to be served by variations in perturbation period are accommodated by composite perturbation streams of required deviating period, produced by combination of one or more secondary streams with that primary stream. Perturbation spacings, for usual applications in the range of 50-1000 µm, with precision of ±10 µm—sufficient for lightwave devices considered—is readily attainable by use of the claimed processes.

Device fabrication is facilitated by reference to "Optical Waveguide Theory", A. W. Snyder and J. D. Love, Chapman Hall, 1983. In that respected text, the authors present a comprehensive analysis of perturbation theory. In addition to dislocations and compositional changes, the authors consider mode-coupling implications of a fiber of sinusoidally varying cross-sectional area—illustrative of "axis perturbations" which may be produced by a method of the invention.

4. Periodic Perturbations

The inventive method yields a perturbation stream of regular period or of period meaningfully varying from that regularity. Depending on change in effective refractive index as encountered ("seen") by a concerned mode, perturbations are of two fundamental types—"size perturbations" and "axis perturbations"—allowing for hybridization and additional (second-order) shape variations. Whether based on size perturbations or axis perturbations, intended devices rely on the resonant (in phase) interchange of optical power between two or more coherent optical signals. Controlling parameters for determining: the range of wavelengths affected in the fiber, the rate of exchange of power, and selectivity of modes to be coupled are: perturbation period; perturbation amplitude; and length of the perturbation stream. The range of these parameters is directly related to the lightguide design and the relative effective index difference between the modes that are to be resonantly coupled by the periodic perturbations.

Second-order influences, perhaps central to particular device design, include: variations in perturbation shape; and in perturbation period. Varying period within a particular stream is generally responsive to superimposition of one or more secondary perturbation streams on the primary stream. The variations may be—generally are—introduced by secondary streams, themselves also of regular periodicity, but of different period from that of the primary stream. In some instances, particularly for optical fiber, it is desirable to have the primary perturbation stream extend through the entire length of the lightguide, for most effective mode stripping or mode mixing.

The invention lends itself to quantity production of classes of discrete components: some now requiring complex and costly fabrication methods, some not now in production. Present-day device-by-device manufacture may now, in large part, be replaced by a continuous draw operation. Devices, including narrow or broadband optical wavelength filters, of design critically dependent on length of fiber to be perturbed, may be produced as spaced perturbation streams within a continuous fiber path. Lengths of separating unperturbed regions may be prescribed so that, devices, once separated, are of suitable length to best enable packaging and sale of the individual elements.

5. Processing/Apparatus

Processing conditions and apparatus design for fiber fabrication are well known. All entail production of a "preform", from which the much smaller dimensioned fiber is drawn. There are three basic preform processes in use at this time: MCVD (Modified Chemical Vapor Deposition), e.g., as described in U.S. Pat. No. 4,217,027; OVD (Outside Vapor Deposition), e.g., as described in U.S. Pat. Nos. 3,711,262 and 3,737,292; and VAD (Vapor Axial Deposition), e.g., as described in U.S. Pat. No. 4,062,665.

All three processes entail deposition from precursor gases, e.g., $SiCl_4$, $GeCl_4$, $POCl_3$, $O_2$, which react to yield the final glass material. MCVD is an "inside" process, starting with a high purity silica tube, within which the flowing gases react under influence of an axially-moving heat source. As the gases react, layers of solid glass deposits built up inside the tube in a radial fashion layer by layer. The tube and deposited glass are then collapsed into a solid core rod. The number and composition of the layers determine the refractive index profile of the core rod. The OVD process is similar to the MCVD process but is an "outside" method with deposition, now of layered porous glass ("soot") on the outside of a bait rod, followed by removal of the bait-rod, and by dehydration, consolidation and collapse to produce the solid preform. The VAD process is another "outside process" where gases are fed through a torch and reacted to form a porous soot deposit on the end of a bait rod, followed by dehydration and sintering as in OVD. There are various intermediate steps in each process where the glass rods may be stretched or cut to get desired dimensions for further processing. Commercial processes use a variety of heat sources, e.g., gas flame, plasma torch.

Jacketing (or "overcladding") may be by insertion of the core rod into a jacketing tube (usually of undoped silica, but sometimes of doped silica), followed by collapse, either in a separate operation or during the draw process. Common jacketing methods for OVD and VAD involve deposition of silica soot onto the core rod, and then dehydrating and sintering into a solid glass preform.

Fiber is drawn from the preform, which is heated usually in a graphite or zirconia furnace with temperature up to 2000° Celsius. The bare fiber is coated during the drawing process with polymer coatings of one or more layers (typically two layers of UV curable polymers) to preserve the high intrinsic high strength of the glass fiber and allow for further practical handling and cabling of the fibers for actual transmission lines. Finally, the coated fiber, likely subjected to various optical, geometrical and strength measurements to verify its quality, is packaged for sale by winding onto a spool in length, e.g., 2.2 kilometers (km) or longer.

A primary advantage of the invention is reliability/precision in perturbation shape, size and spacing—all accommodated in fabrication of state-of-the-art optical fiber. Adaptation of known processes and apparatus to the needs of the invention requires only means for introduction of an acoustic wave into the fluid, in accordance with:

$$l = s/f \qquad \text{Eq.1}$$

in which:
  l=axial period of the perturbation stream,
  s=draw rate, and
  f=frequency of the as-generated acoustic wave.

A suitable acoustic wave generator consists of: 1) an electric wave generator, i.e., an oscillator, constituting an electrical resonant circuit of fixed or variable resonance frequency, together with; 2) a transducer for converting electric wave energy into acoustic wave energy. Depending upon the desired axial period of the perturbation stream and the draw rate, the acoustic wave frequency is likely to be in the range of from 100-500,000 Hertz (Hz).

FIGS. 1 and 2 schematically represent fiber fabrication processes for introduction of the fundamental types of geometric perturbations: FIG. 1 for "axis perturbations"; and FIG. 2 for "size perturbations". Modifications may provide for hybrids of the two processes, as well as for accompanying profile or shape changes. While there is some overlap between the processes of the figures, they accurately portray the basic difference between the two prototypes. FIG. 1, in showing localized acoustic coupling of wave energy in transverse direction relative to the fiber axis, is representative of processes using unbalanced transversely applied force for perturbing axis direction, with little or no change in cross-section size or index profile. FIG. 2, in showing distributed acoustic coupling, is representative of processes for perturbing cross-section size, without necessarily changing axis direction. Accompanying shape variation may be provided for in the FIG. 2 process simply by making the peripheral coupling forces non-uniform. A contemplated variation of the FIG. 2 process—the equivalent of uniform peripheral transverse coupling—couples the wave axially, e.g., by oscillation of the preform in the axial direction.

Corresponding elements of FIG. 1 and FIG. 2 are identified by two-digit numbers of the same second digit. FIGS. 1 and 2 show the same fundamental process, with preform 10, 20 undergoing heating by heat source 11, 21, thereby liquifying, and accordingly, permitting draw-reduction of fiber in fluid region 12, 22. As drawn, the fiber then passes through coating die 13, 23, yielding coated fiber 14, 24 which then passes over a capstan 15, 25 onto storage spool 16, 26. Alternative means for introduction of the acoustic wave—ultimately into fluid region 12, 22—are shown: 1) via ambient by means of an acoustic generator constituted of oscillator/transducer 17a/18a, 27a/28a functioning in the manner of an acoustic loud-speaker, and; 2) via solid material—i.e., via preform 10, 20 by means of oscillator/transducer 17b/18b, 27b/28b or via capstan 15, 25 and fiber 14, 24 by means of oscillator/transducer 17c/18c, 27c/28c.

FIGS. 1 and 2 represent the two prototype processes—in succession, the asymmetric and symmetric distortion processes of the invention. The FIG. 1 schematic representation of asymmetric distortion, showing acoustic wave generation by a single, unidirectional generator, faithfully describes likely implementation of the preferred embodiment. Implementation of the FIG. 2 prototype process, however, while possibly utilizing the two oppositely-directed generators shown, may take other forms. These include use of three or more generators, symmetrically disposed about the preform or draw region, as well as of a single, axially-directed generator. The latter is schematically represented by oscillator-transducer 27c/28c, which in periodically displacing capstan 25, introduces axially-directed oscillation.

FIG. 3 is a schematic representation of an axially distorted lightguide 30. Its axis perturbations of period 31, which might have been introduced in the process of FIG. 1, are shown as accompanied by undulating axis 32, of axis distortion values 34, relative to straight, axis 33 (of an unperturbed lightguide from which it might have been derived). It is an attribute of the invention that surface undulations 35 are, in general, a sufficient indicator of axis perturbations for purpose of monitoring.

FIG. 4 shows a lightguide 40, containing size perturbations of period 41. Shown relative to an unperturbed lightguide 42, from which it may have been derived, axis 43 is unmodified. Size perturbations 41 are readily monitored as surface undulations 44.

6. EXAMPLES

The inventive process, since dependent on wave motion within the fluid, is subject to stabilizing forces—viscosity and surface tension—both likely of radially uniform value—nominally does not alter fiber profile. Undulations are considered in these nominal terms. Variations in local index, created by the additional stresses that may be induced by the acoustic signals (point-to-point, within the cross section or along the fiber length), observed in the examples, since of the same periodicity of the nominal undulations, contribute to behavior.

The following conditions, determinative of relationship between, 1) amplitude of the acoustic wave in the fluid at the solidifying fluid-solid interface and, 2) the amplitude of the resulting surface undulations on the solidified fiber, apply to all numbered examples:

| | |
|---|---|
| Fluid temperature in the vicinity of the interface | about 1980° C. |
| Length of fiber under tension (length of fiber between draw interface and storage spool) | 6.23 meters |
| Tension on fiber during drawing operation | 70 grams |
| Draw rate | 10 meters/second |
| Length of acoustic wave | 1 meter |
| Preform dimensions | 100 mm diameter × 2 m long |

EXAMPLE 1

Fabrication of a Perturbed Multimode Fiber

Multimode fiber, having a 50 µm core of uninterrupted near-2 alpha profile, of matched cladding of undoped silica, containing a continuous axis-perturbation primary perturbation stream of 1000 µm period, is fabricated using the apparatus/method of FIG. 1. Oscillator-transducer 17a/18a, operating at frequency of 10,000 Hz, with pressure of 2.4 Pascals (Pa) at the fluid surface, produces an acoustic wave of approximately 1 µm amplitude, in the fluid 12 in the vicinity of the fluid-solid draw interface, resulting in a surface undulation of >0.001 µm in the solidified fiber.

EXAMPLE 2

Fabrication of Enhanced Multimode Fiber of Co-pending Patent Application, "Enhanced Multimode Fiber,"

The procedure of Example 1 is followed, with drawing from a preform with index discontinuity consisting of an annular feature of reduced index of 50% Δ, with inner bound located at 0.7 of the core radius. An additional perturbation stream, of 1300 µm period, is superimposed on the primary stream for stripping the highest order mode group, by introduction of a second acoustic wave. Oscillator-transducer 17a/18a, operating at dual frequencies—7500 Hz as well as 10000 Hz—with locally attained pressure of 1.5 Pa produces a composite acoustic wave—the composite of two 1 µm waves—as measured in the vicinity of the fluid-solid draw interface, with resulting superimposed surface undulations >0.001 µm in the solidified fiber.

EXAMPLE 3

Fabrication of Enhanced Single-Mode Fiber of Co-pending Patent Application "Optical Fiber For Single-Mode Operation,"

ESMF, for single-mode operation at 1550 nanometers (nm), containing a continuous size-perturbation stream of 700 µm period, is fabricated by use of the apparatus/process of FIG. 2. As described in the co-pending application, provision for single-mode operation over the operating range of 1300-1700 nm requires eliminating many unwanted higher order modes. As there discussed, single-mode operation over that wavelength range is effected by resonantly coupling all such higher order modes to cladding modes. To achieve this over the entire range of 1300-1700 nm requires coupling frequencies over the range of 350-700 µm. Acoustic waves of frequencies spanning the range 17000-34000 Hz are required to achieve such mode stripping. An oscillator-transducer 27a/28a, operating with all frequencies from 17000-34000 Hz, with pressure of 10-20 Pa as measured at the surface of the fluid at the draw interface, produces an acoustic wave of approximately 1 µm amplitude, as measured in the fluid 12 in the vicinity of the fluid-solid draw interface, resulting in a surface undulation of >0.001 µm in the solidified fiber.

EXAMPLE 4

Size Perturbations to Induce Coupling of Polarization Modes

The effective index difference, $\Delta n_{\mathit{eff}}$, between the two polarizations of the first-order linearly polarized mode is typically 3 orders of magnitude lower than that between different order linearly polarized modes. To couple the different polarization states of the fundamental mode, therefore, requires a period that is typically 3 orders of magnitude larger.

A single-mode fiber containing a continuous size perturbation stream of 10,000 µm period is fabricated using the apparatus of FIG. 2. Oscillator-transducer 27c/28c is operated at frequency of 100 Hz, with the direction of acoustic propagation now oriented along the axis of the fiber. Operation with surface pressure of 0.004 Pa, as measured in the vicinity of the draw interface, yields an acoustic wave of approximately 1 µm amplitude, with resulting surface undulation of >0.001 µm in the solidified fiber. Due to the low levels of acoustic pressures experienced—acoustic isolation of the region of the fiber exposed to the vibration will generally be necessary to ensure that other sources of such vibrations are not inadvertently introduced.

Additional Figures

Figure 5:
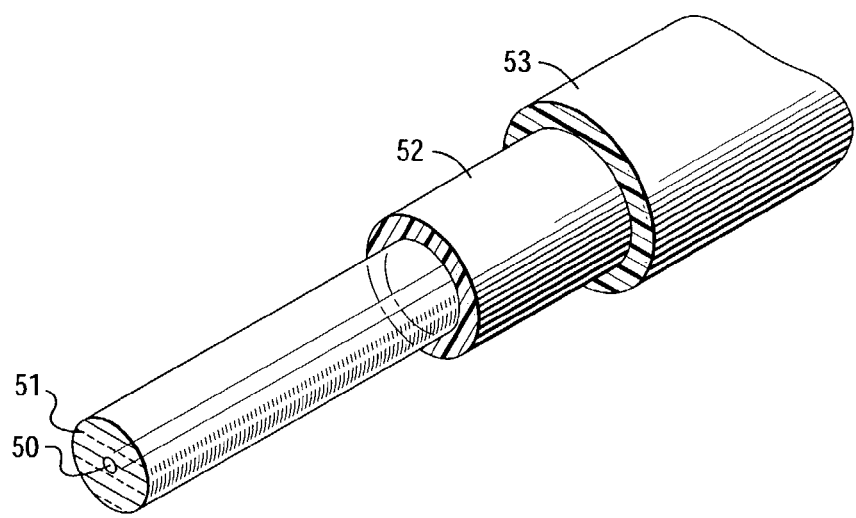
FIG. 5 is a perspective view of a perturbed fiber, dual coated in accordance with conventional practice.

FIG. 5 is a perspective view of a fiber fabricated in accordance with the process of the invention, the fiber consisting of a core 50, cladding 51, together with primary and secondary coatings 52 and 53.

Figure 6:
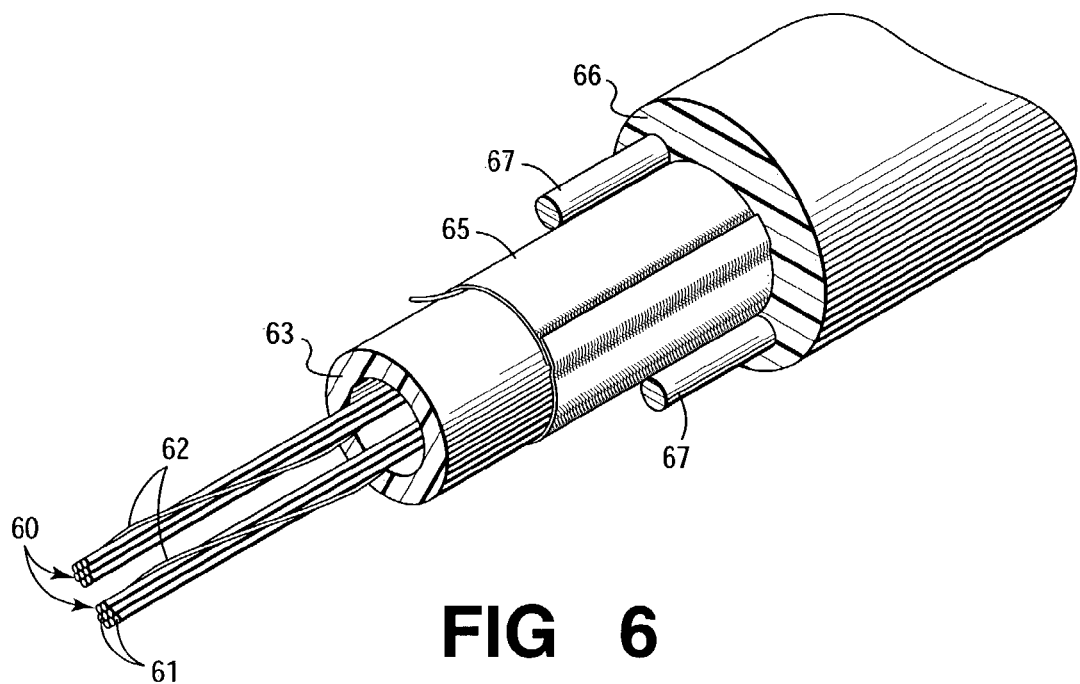
FIG. 6 is a perspective view of one form of cable structure containing grouped perturbed fibers.

FIG. 6 depicts one form of commercial cable described in *AT&T Lightguide Cable*, December, 1990. It is constituted of two bundles 60, each bundle containing 12 color-coded fibers 61, held together by an encircling winding 62. Individual fibers 61 are of the general design of that of FIG. 5. The complete structure includes core tubes 63, cable-filling compound 64, and two protective structures, each constituted of a water-blocking tape 65 and a polyethylene jacket 66, with each structure reinforced by steel wires 67.

Figure 7:
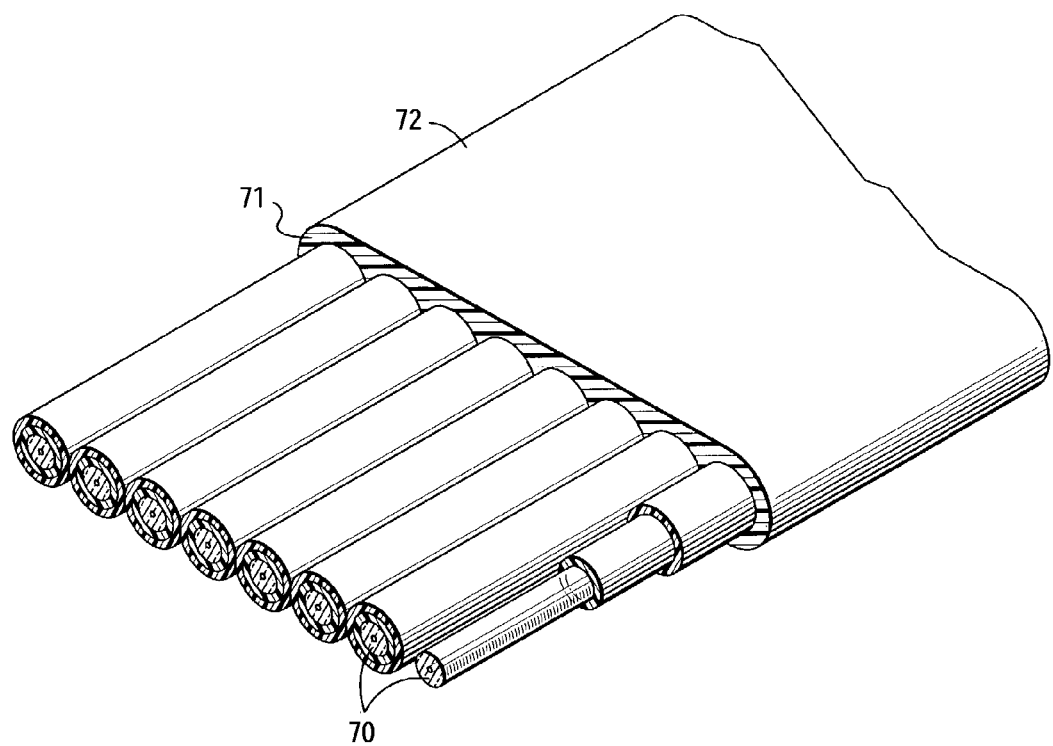
FIG. 7 is a perspective view of an array—an AccuRibbon® parallel array—containing twelve such fibers.

FIG. 7 is a perspective view of an AccuRibbon® planar fiber array, comprising 12 fibers 70 of the structure of FIG. 5, filler material 71, and sheathing 72.

Figure 8:
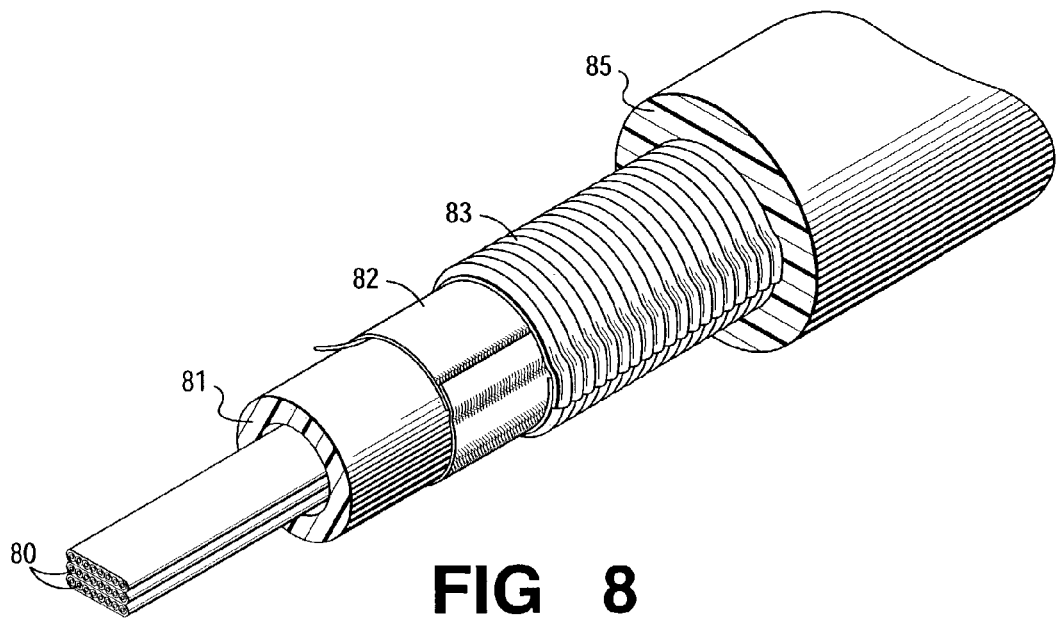
FIG. 8 is a perspective view of a cable containing several parallel arrays of perturbed fibers.

FIG. 8 shows a cable containing several planar arrays 80, each of the structure shown in FIG. 7. Crossply sheath 81 is filled with cable-filling compound 82. The particular structure shown is an under-water armored cable, including overwrappings constituting conductive shield 83 and bonded jacket 85.

The invention claimed is:

1. Method for manufacture of a lightguide device, comprising:
    directionally solidifying a solid body from a fluid across a solidifying interface between the solid body and the fluid, the device including a glass lightguide comprising a core and a cladding, and the lightguide containing a series of geometric perturbations for provoking mode coupling,
CHARACTERIZED IN THAT
    the method comprises introduction of at least one acoustic wave in the fluid by means of an acoustic generator which is acoustically coupled with the fluid, whereby the acoustic wave introduces periodic deformations into the solidifying body, such deformations comprising said geometric perturbations.

2. Method of claim 1 in which the fluid is in contact with gaseous ambient, and in which the acoustic generator is coupled with the fluid via such ambient.

3. Method of claim 2 in which coupling is localized at a single peripheral position about the fluid, whereby the deformations are asymmetric and perturbations comprise directional bends in the device.

4. Method of claim 1 in which the fluid forms a liquefying interface with a starting body.

5. Method of claim 1, in which the fluid constitutes the draw zone intermediate the fiber and a fiber preform.

6. Method of claim 5 in which the core is of sufficient size for supporting at least two linearly polarized modes at said operating wavelength.

7. Method of claim 6 in which the device comprises a multimode optical fiber.

8. Method of claim 1 in which the series constitutes a minimum of 5 perturbations and in which perturbations are of periodicity to provoke coupling of a guided mode with a cladding mode.

9. Method of claim 1 in which at least two acoustic waves of differing frequencies are simultaneously generated in the fluid, thereby generating a composite acoustic wave and introducing a corresponding composite stream of deformations into the solidifying body.

10. Method of claim 1 in which the deformations are accompanied by surface undulations in the solidifying body, said undulations being of radially measurable magnitude in the range of 10-1000 Angstroms (Å).

11. Method of claim 1 in which the acoustic wave is maintained of essentially constant period during solidification of body length, whereby said geometric perturbations are of nominally constant period.

* * * * *